March 27, 1934.  G. B. WETTSTEIN  1,952,346
TURNING HEADLIGHTS FOR VEHICLES
Filed Sept. 28, 1932  2 Sheets-Sheet 1
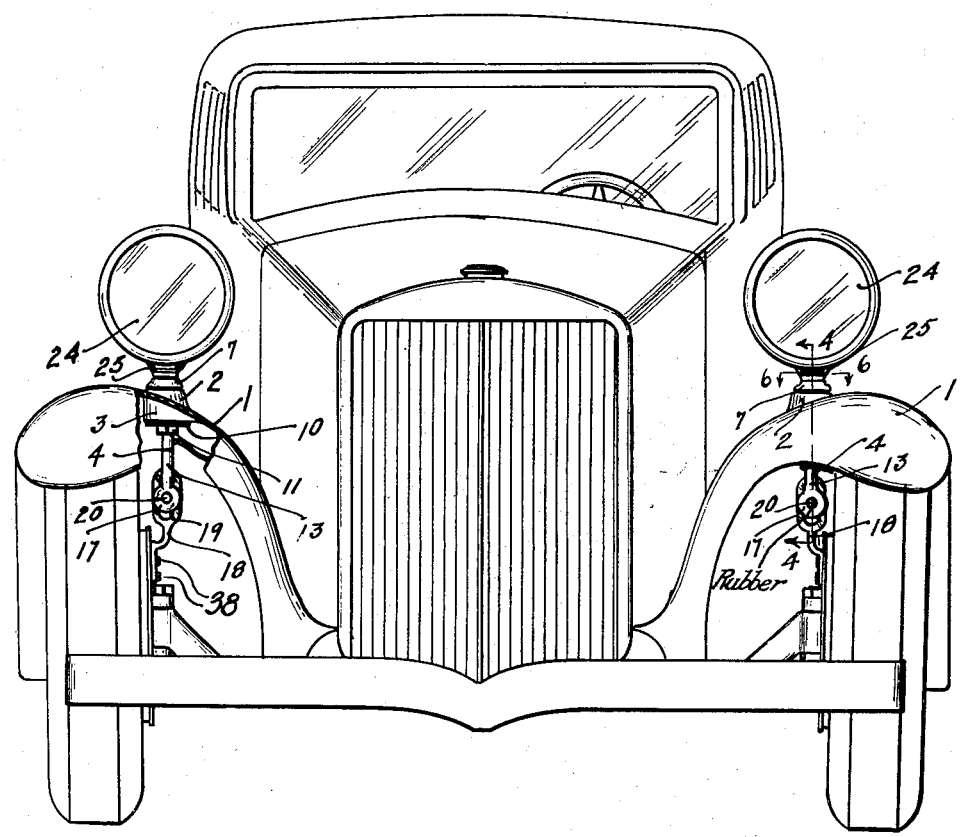
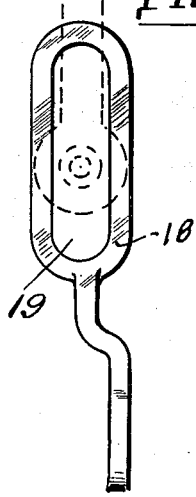
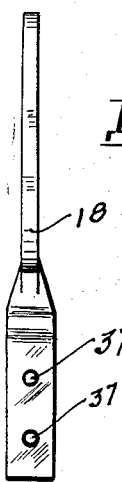
Inventor
Godfrey B. Wettstein

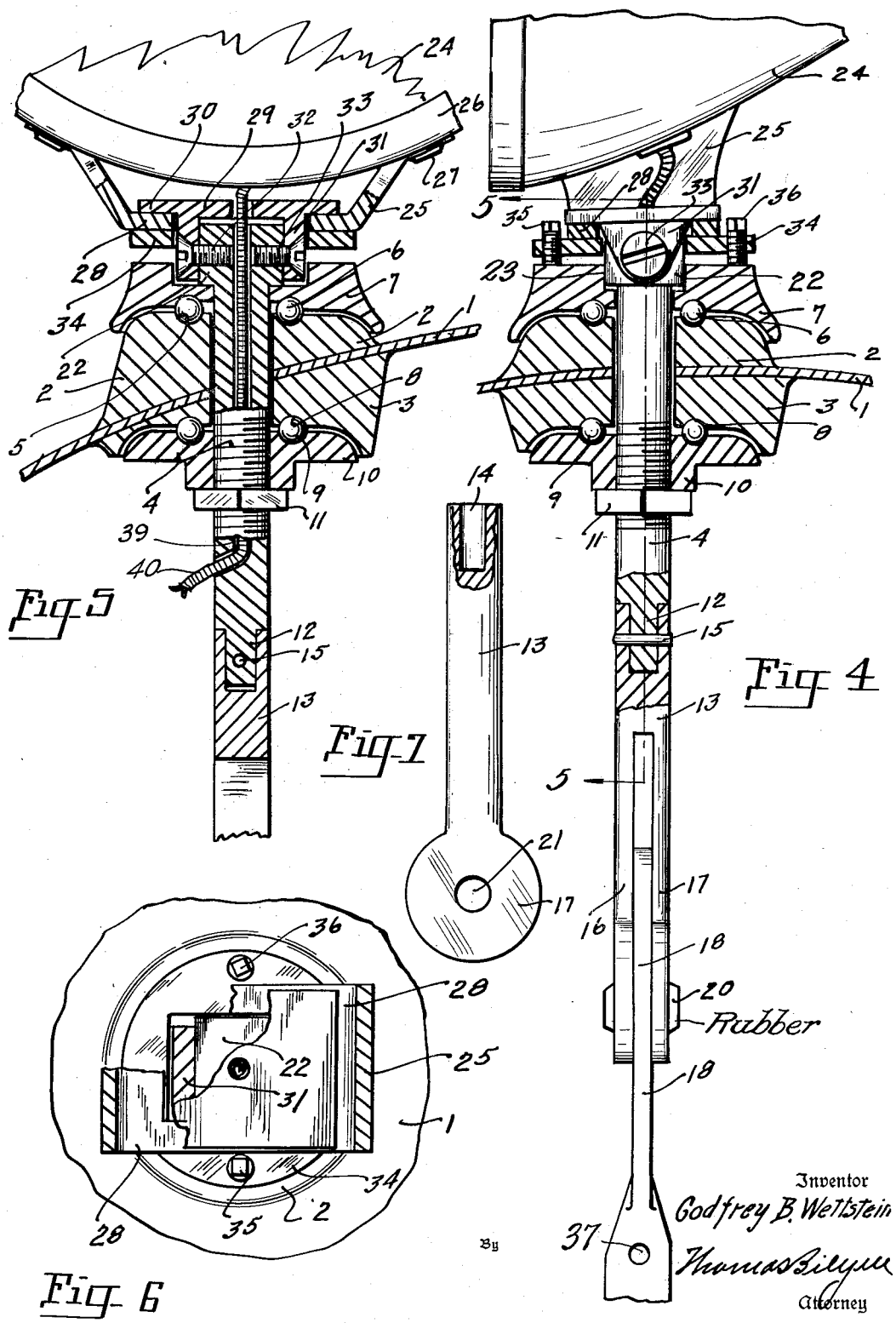

Patented Mar. 27, 1934

1,952,346

UNITED STATES PATENT OFFICE 1,952,346

TURNING HEADLIGHTS FOR VEHICLES

Godfrey B. Wettstein, Portland, Oreg.

Application September 28, 1932, Serial No. 635,179

2 Claims. (Cl. 240—62)

The headlight embodying my invention is adapted for being supported upon the front fender of the motor vehicle and for being turned as the wheel is turned, to thereby illuminate the pathway over which the vehicle is to be driven.

Through the use of my new and improved construction I attach the steering column of the headlight directly with the front wheel of the vehicle and as the front wheels of the vehicle are moved for steering purposes, the headlights are simultaneously and automatically moved to place the projected rays of light emanating from the headlight, in the path of travel of the vehicle, and to at all times maintain the projected light rays in the path of travel of the wheels.

The invention is comprised primarily of a companion split bearing adapted for placement upon the front fender of the motor vehicle. Ball races are adapted to the outer face of each member of the base and to which supporting caps are adapted. The supporting caps are spaced from the base members by the balls disposed within the respective races. A steering column passes through the race and base assembly.

A take-up and flexible connection is disposed within the column that adapts the same for being attached to the front wheel of the motor vehicle.

A headlight is superposed upon the base assembly and the same is so constructed as to provide for adjustment of the headlight to predetermine the path of the projected rays emanating from the headlight.

Means is provided centrally of the column assembly for conducting the electric current through and into the headlight. The primary purpose and object of my invention is to provide an assembly adapted for placement upon motor vehicles and for attachment to the front wheel of the motor vehicle so that the headlight will be turned as the steering wheel is turned.

A still further object of my invention consists in so constructing my device that it will have a minimum number of parts and one that will have a long and useful life with practical freedom from operating annoyance.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a front view of a motor vehicle, illustrating a pair of my new and improved headlights attached to the front fender of the motor vehicle. One of the front fenders is partially broken away to illustrate the attaching of the device to the front fender.

Fig. 2 is a fragmentary, front view of the assembly bracket adapted for attachment to the front wheel and the base portion of the column attached thereto.

Fig. 3 is a side view of the base portion illustrated in Fig. 2 which is the member that is attached to the front wheel of the motor vehicle.

Fig. 4 is a longitudinal, sectional side view of the assembled device. This view is taken on line 4—4 of Fig. 1, looking in the direction indicated.

Fig. 5 is a fragmentary, sectional, front view of the mechanism illustrated in Fig. 4. This view is taken on line 5—5 of Fig. 4, looking in the direction indicated.

Fig. 6 is a fragmentary, sectional, top plan view of the mechanism illustrated in Fig. 1. This view is taken on line 6—6 of Fig. 1, looking in the direction indicated.

Fig. 7 is a side view of the lower link portion of the column upon which the headlight is disposed.

Like reference characters refer to like parts throughout the several views.

Reference numeral 1 indicates the front fender of a motor vehicle. Above and below each fender I provide companion base flanged supports 2 and 3. The base flanged support 2 is placed upon the top side of the fender 1 and the base flanged support 3 is placed upon the bottom side of the fender 1. The two are placed in registry alignment with each other and through which the supporting column 4 passes. A ball receiving raceway 5 is disposed in the top surface of the base 2 and a plurality of ball bearings 6 are disposed within the raceway. A collar 7, having a companion raceway disposed upon its underside, is adapted to the ball bearings 6 to form an antifriction bearing connection therebetween. A raceway 8 is disposed upon the underside of the base member 3 and a plurality of ball bearings 9 are adapted thereto. A companion collar 10 is adapted to the ball bearings to provide a frictionless bearing upon the underside of the base support. The column 4 is threaded upon its outer lower surface and a lock nut 11 is adapted to the threaded portion. The purpose of the lock nut is to maintain a proper working bearing relationship between the respective raceways, ball bearings and collars. The adjustment of the nut 11 permits a precise predetermined pressure being placed upon the respective ball bearings.

A stub shaft 12 terminates the lower end of the column 4 and a link 13 is adapted to the stub shaft. A recess 14 is disposed in the upper end of the link 13 and into which the shaft portion 12 of the column 4 is adapted. A pin 15 passes through the adjacent members to form a tight working relationship between the upper end of the link 13 and the lower end 12 of the column 4.

The link 13 is bifurcated at its lower end to form a pair of jaws 16 and 17. The jaws are spaced apart to permit the upper end of the wheel attaching base member 18 being placed therebetween. The upper end of the base member is slotted, as shown at 19. The purpose and object of the slot is to compensate for the spring movement of the vehicle and to permit a free up and down movement of the link 13 relative to the base attaching member 18.

One or more of these members may be made non-metallic to eliminate friction and noise. A pin 20 passes through a hole 21 disposed in the respective jaws 16 and 17 and through the slot 19. This pin may be made of rubber or other non-metallic material to further reduce any noises being developed by the engaging surfaces of the pin and the bearings.

The column 4 terminates in a head 22 on its upper end and the head 22 is adapted into a recess 23 disposed in the top side of the collar 7.

The headlight is shown at 24. I place a flanged connection 25 at the base of the headlight and I secure the flange to the headlight casing 26 by any suitable fastening means, as through the use of screws 27. The flanged connection 25 has an inner extending peripheral flanged base 28. A relatively large opening is made central of the flanged base and through which a suitable fastening head 29 is made to pass. The fastening head 29 has an outwardly extending rim 30. The rim 30 is made to engage upon the flanged base 28 and forms a tight working relationship between the flange and the rim.

The head 22 of the column 4 upwardly extends into the base 31 of the fastening head and the two are rockably connected together through the use of fastening screws 32 and 33. The under surface of the flanged base 28 rests directly upon a tiltable ring 34 and adjusting set screws 35 and 36 threadably pass through the adjusting ring 34 and engage upon the top side of the collar 7. The purpose and object of the set screws and the ring is to tilt the headlight to the desired angle in order that the projected rays of the headlight may be adjusted in their path of projection. A plurality of fastening holes 37 are disposed at the bottom end of the attaching base member 18 and the attaching base member 18 is secured to any stationary member associated with the front wheel at any desired location by any suitable fastening means as through the use of fastening bolts 38.

A hole 39 is disposed longitudinally through the column and holes that are in registry alignment with the hole 39 are disposed through the tiltable ring and through the fastening head and through which an electric conductor 40 passes for conducting electricity, from a source of electric energy not here shown, to the headlight.

While the form of mechanism herein shown and described is adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, in combination with a vehicle having front wheel brakes, the combination of a headlight rotatably and tiltably mounted to the fender of the vehicle, a column depending from the headlight and extending through the fender, a link bifurcated into a pair of apertured jaws at its lower end and secured at its upper end to the lower end of the column, a base member secured to the brake housing and extending upwardly therefrom, the upper end of the base member being formed with an elongated aperture and embraced within the lower and bifurcated end of the link, a resilient pin extending through the apertured jaws and through the elongated aperture in the base member and slidably embraced thereby.

2. In a device of the class described, in combination with a vehicle having front wheel brakes, the combination of a headlight rotatably and tiltably mounted to the fender of the vehicle, a base member secured to one of its ends to the brake housing and extending upwardly therefrom, the upper end of the base member being formed into an elongated aperture, a column and link interconnecting the headlight with the base member, said link being slidably mounted to the base member by means of a rubber pin.

GODFREY B. WETTSTEIN.